US011294999B2

(12) United States Patent
Dubeau (10) Patent No.: US 11,294,999 B2
(45) Date of Patent: Apr. 5, 2022

(54) TECHNOLOGIES FOR AUTHORIZING, AUTHENTICATING, AND GRANTING EXCEPTIONAL ACCESS TO AN ELECTRONIC DEVICE OR ACCOUNT (71) Applicant: BARLEA CORPORATION, Bothell, WA (US)

(72) Inventor: Daniel J. Dubeau, Bothell, WA (US)

(73) Assignee: BARLEA CORPORATION, Bothell, WA (US)

( * ) Notice: Subject to any disclaimer, the term of this patent is extended or adjusted under 35 U.S.C. 154(b) by 154 days.

(21) Appl. No.: 16/926,362

(22) Filed: Jul. 10, 2020

(65) Prior Publication Data
US 2021/0049255 A1 Feb. 18, 2021

Related U.S. Application Data (60) Provisional application No. 63/004,245, filed on Apr. 2, 2020, provisional application No. 62/887,409, filed on Aug. 15, 2019.

(51) Int. Cl.
*G06F 21/35* (2013.01)
*G06Q 50/26* (2012.01)
(Continued)

(52) U.S. Cl.
CPC ............. *G06F 21/35* (2013.01); *G06Q 50/26* (2013.01); *H04L 9/0637* (2013.01); *H04L 2209/38* (2013.01)

(58) Field of Classification Search
CPC ....... G06F 21/35; G06F 21/335; G06Q 50/26; H04L 9/0637; H04L 2209/38; H04L 9/3239; H04L 63/123; H04L 63/306
See application file for complete search history.

(56) References Cited

U.S. PATENT DOCUMENTS

2012/0158955 A1 6/2012 Kim et al.
2017/0011460 A1* 1/2017 Molinari ............... G06F 21/645
(Continued)

FOREIGN PATENT DOCUMENTS

WO WO-2018/126029 A2 7/2018
WO WO-2019/036804 A1 2/2019

OTHER PUBLICATIONS

Di Graski, "When Might Blockchain Appear in Your Court?" Trends in State Courts 2018, p. 62-66.
(Continued)

*Primary Examiner* — Darren B Schwartz
(74) *Attorney, Agent, or Firm* — Marshall, Gerstein & Borun LLP (57) ABSTRACT

Systems and methods for enabling access to electronic devices using smart contracts on a blockchain are disclosed. According to certain aspects, a law enforcement agency may request access to a target electronic device or account and a plurality of node computers may initiate a corresponding smart contract transaction. A judicial entity may review a warrant request and determine to issue a warrant, where the plurality of node computers update the smart contract transaction accordingly. Additionally, a manufacturer entity associated with the target electronic device or account may determine to comply with the warrant, thus fulfilling the smart contract transaction, resulting in a generation of a code that grants the law enforcement agency access to the target electronic device or account.

19 Claims, 4 Drawing Sheets

(51) Int. Cl.
    *H04L 9/06*     (2006.01)
    *G06F 21/33*     (2013.01)
    *H04L 9/32*     (2006.01)

(56) References Cited

U.S. PATENT DOCUMENTS

| | | |
|---|---|---|
| 2017/0272248 A1 | 9/2017 | Ozzie |
| 2018/0082024 A1* | 3/2018 | Curbera ................ H04L 9/0637 |
| 2018/0096175 A1 | 4/2018 | Schmeling et al. |
| 2018/0232526 A1* | 8/2018 | Reid ..................... H04L 9/3271 |
| 2018/0337771 A1 | 11/2018 | Baker et al. |
| 2019/0295202 A1* | 9/2019 | Mankovskii .......... H04L 9/3239 |
| 2020/0279257 A1* | 9/2020 | Cheng .................. G06Q 20/405 |

OTHER PUBLICATIONS

Gcn.com, GCN—Industry Insight, "How blockchain can improve public safety," Apr. 17, 2019. Retrieved from the Internet on Jun. 25, 2019: https://gcn.com/Articles/2019/04/17/blockchain-public-safety.aspx?Page=2&p=1.

Link.springer.com—"The genesis of the European Union's new proposed legal instrument(s) on e-evidence". Published: Sep. 3, 2018. Retrieved from the Internet: https://link.springer.com/article/10.1007/s12027-018-0525-4.

International Application No. PCT/US2020/041561, International Search Report and Written Opinion, dated Oct. 21, 2020.

Ryu et al., A blockchain-based decentralized efficient investigation framework for IoT digital forensics, J. Supercomputing, 73:4372-87 (Feb. 15, 2019).

* cited by examiner

TECHNOLOGIES FOR AUTHORIZING, AUTHENTICATING, AND GRANTING EXCEPTIONAL ACCESS TO AN ELECTRONIC DEVICE OR ACCOUNT

CROSS-REFERENCE TO RELATED APPLICATIONS

This application claims priority to U.S. Provisional Application No. 63/004,245, filed Apr. 2, 2020, and to U.S. Provisional Application No. 62/887,409, filed Aug. 15, 2019, the disclosures of which are hereby incorporated by reference in their entireties.

FIELD

The present disclosure is directed to blockchain technologies. More particularly, the present disclose is directed to platforms, components, and techniques for using smart contract transactions on a blockchain to request and grant access to electronic devices.

BACKGROUND

The ownership and use of personal electronic devices such as smartphones and other devices continues to increase. Sometimes, electronic devices owned or used by certain individuals may be used in association with (or store information associated with) violations of laws, rules, or regulations. In these situations, an applicable law enforcement agency (e.g., a police department) may want to access a specific electronic device to retrieve or access information that may be associated with or relevant to a violations, such as to gather evidence or build a case.

Typically, electronic devices may be secured by an installed operating system such that the stored data and information may not be accessible without a correct password or an input of matching biometric information. Additionally, manufacturers associated with electronic devices may not be inclined to grant law enforcement agencies access to the devices because such access may compromise or undermine the overall security measures developed and established by the manufacturers. Therefore, law enforcement agencies and manufacturers may be at a dispute as to whether such access is granted, even in cases of great public concern (e.g., a mass shooting).

Accordingly, there is an opportunity for systems and methods to request and grant access to electronic devices using smart contract transactions implemented on a blockchain.

DETAILED DESCRIPTION

According to the present embodiments, systems and methods for enabling access to electronic devices or accounts using smart contract transactions facilitated via the blockchain or other distributed ledger are described. The systems and methods are intended to resolve certain conflicts of interest among law enforcement agencies having obligations to people of their jurisdictions, judicial entities (e.g., courts) having obligations to the people within and outside of their jurisdictions, and device manufacturers having obligations to their customers, employees, and shareholders.

According to certain aspects, the systems and methods enable multiparty smart contract authorization that requires legal standing and consensus among all parties. Additionally, the systems and methods support a public record of device access requests, approvals, and denials, and resulting legal actions. As additional benefits, consumer and privacy advocates, government watchdog organizations, and corporate entities are able to monitor activity for systemic abuses, legislative entities are able to regulate the use, function, and scope of the systems and methods, and countries, organizations, and jurisdictions are able to use the systems and methods in accordance with local customs and regulations (e.g., the United States and the European Union may implement the systems and methods independently and with different processes).

Further, by involving the multiple parties and entities, the systems and methods help prevent potential overreach and systemic abuse by law enforcement agencies and court systems, as well as prevent obstruction of justice or the stymieing of legitimate law enforcement investigations. Moreover, the systems and methods enable manufacturers to grant access to electronic devices with varying conditions or degrees, including specific timeframes and durations, and specific categories or types of data, applications, or activity. It should be appreciated that additional benefits are envisioned.

Figure 1:
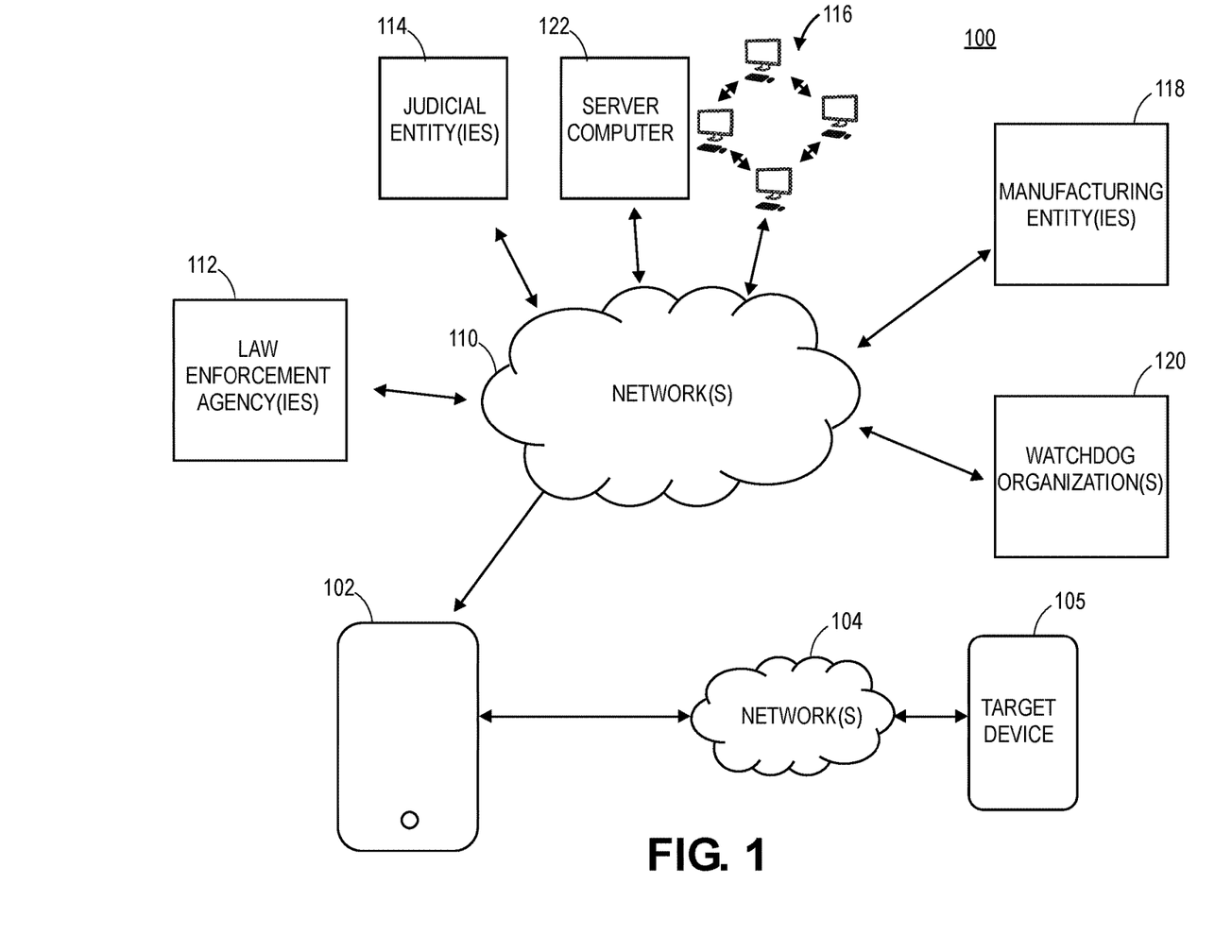
FIG. 1 depicts an overview of components and entities associated with the systems and methods, in accordance with some embodiments.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a server computer 122 that may be associated with an entity such as a company, business, corporation, or the like, which facilitates various of the functionalities associated with the systems and methods. The system 100 may further include the following components or entities: a set of law enforcement agencies 112, a set of judicial entities 114, a set of blockchain components 116, a set of manufacturing entities 118, and a set of watchdog organizations 120. According to embodiments, each of the set of law enforcement agencies 112, the set of judicial entities 114, the set of manufacturing entities 118, and the set of watchdog organizations 120 may be configured with a set of computers, servers, or electronic devices that may facilitate the communications and functionalities as discussed herein.

According to embodiments, the set of law enforcement agencies 112 may represent police departments or other agencies tasked with investigating alleged crimes and enforcing applicable laws and regulations; the set of judicial entities 114 may be courts or court systems across various jurisdictions tasked with issuing warrants and decisions associated with cases, trials, and the like; the set of manufacturing entities 118 may be a company, enterprise, corporation, or the like that may design, develop, manufacturer, and/or distribute electronic devices or components thereof (e.g., hardware and/or software components or applications) that may be purchased and used by individuals; and the set of watchdog organizations 120 may be various government or advocacy organizations that provide oversight and watchdog activities. Each of the set of manufacturing entities 118 may choose to opt into the described systems and methods, and may configure associated electronic devices with an ability to enable access in accordance with the described embodiments.

In some embodiments, the set of manufacturing entities 118 may be a servicer of an account that may be held by an individual or user (in which case the manufacturing entity 118 may be an account servicer entity). Generally, an account may be require credentials (e.g., a username, password, two-factor authentication, etc.) in order for an individual or user to log into or access the account, such that the individual or user may not be able to access the account if the individual or user is not able to access or does not know the credentials. An account servicer entity may store the credentials corresponding to accounts, as well as various information associated with the accounts, in a database or other type of local or distributed storage.

The server computer 112, the set of law enforcement agencies 112, the set of judicial entities 114, the set of blockchain components 116, the set of manufacturing entities 118, and the set of watchdog organizations 120 may communicate with each other via one or more networks 110. In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others).

According to embodiments, the set of blockchain components 116 may be a set of node computers that may communicate with each other via the one or more networks 110. According to embodiments, the set of node computers may represent a decentralized database where each of the set of node computers store and update a copy of a ledger on which blockchain transactions may be initiated and stored. As changes are made to the ledger, each node computer receives the change via network(s) 110 and updates its respective copy of the shared ledger. A consensus mechanism may be used by the set of node computers to decide whether it is appropriate to make received changes to the ledger. Each node computer therefore has its own copy of the ledger, which is identical to every other copy of the ledger stored by the other node computers. The shared ledger implementation is more robust than a central authority database system because of the shared ledger's decentralized nature. As such, there is no single point of failure on the shared ledger as there would be in a centralized system.

The blockchain transactions facilitated by the set of blockchain components 116 may be in the form of smart contracts intended to digitally facilitate, verify, and/or enforce the negotiation or performance of a contract, where the smart contracts are trackable and irreversible. When an event outlined in a given smart contract is triggered, the code written into the smart contract executes. According to the present embodiments, the parties to the smart contracts may include the set of law enforcement agencies 112, the set of judicial entities 114, and the set of manufacturing entities 118.

The system 100 may further include an electronic device 102 that may be associated with or operable by an individual associated with the law enforcement agency 112. The electronic device 102 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

According to embodiments, the server computer 122 may support a software application, website, and/or portal that is executable and/or accessible by the electronic device 102, the set of law enforcement agencies 112, the set of judicial entities 114, the set of blockchain components 116, the set of manufacturing entities 118, and the set of watchdog organizations 120. The software application, website, and/or portal may interface with the set of blockchain components 116 to initiate or create smart contract transactions on the blockchain (i.e., distributed ledger).

The electronic device 102 may also connect to and interface with a target electronic device 105 via a network(s) 104, such as a personal area network (PAN) (e.g., Bluetooth), local area network (LAN), or a direct connection. According to embodiments, the set of law enforcement agencies 112 may desire to access data stored on the target electronic device 105, which may trigger the creation and updating of a smart contract transaction by the set of blockchain components 116 and facilitated by the software application, website, and/or portal. These and other functionalities are described in further detail with respect to FIG. 2.

Figure 2:
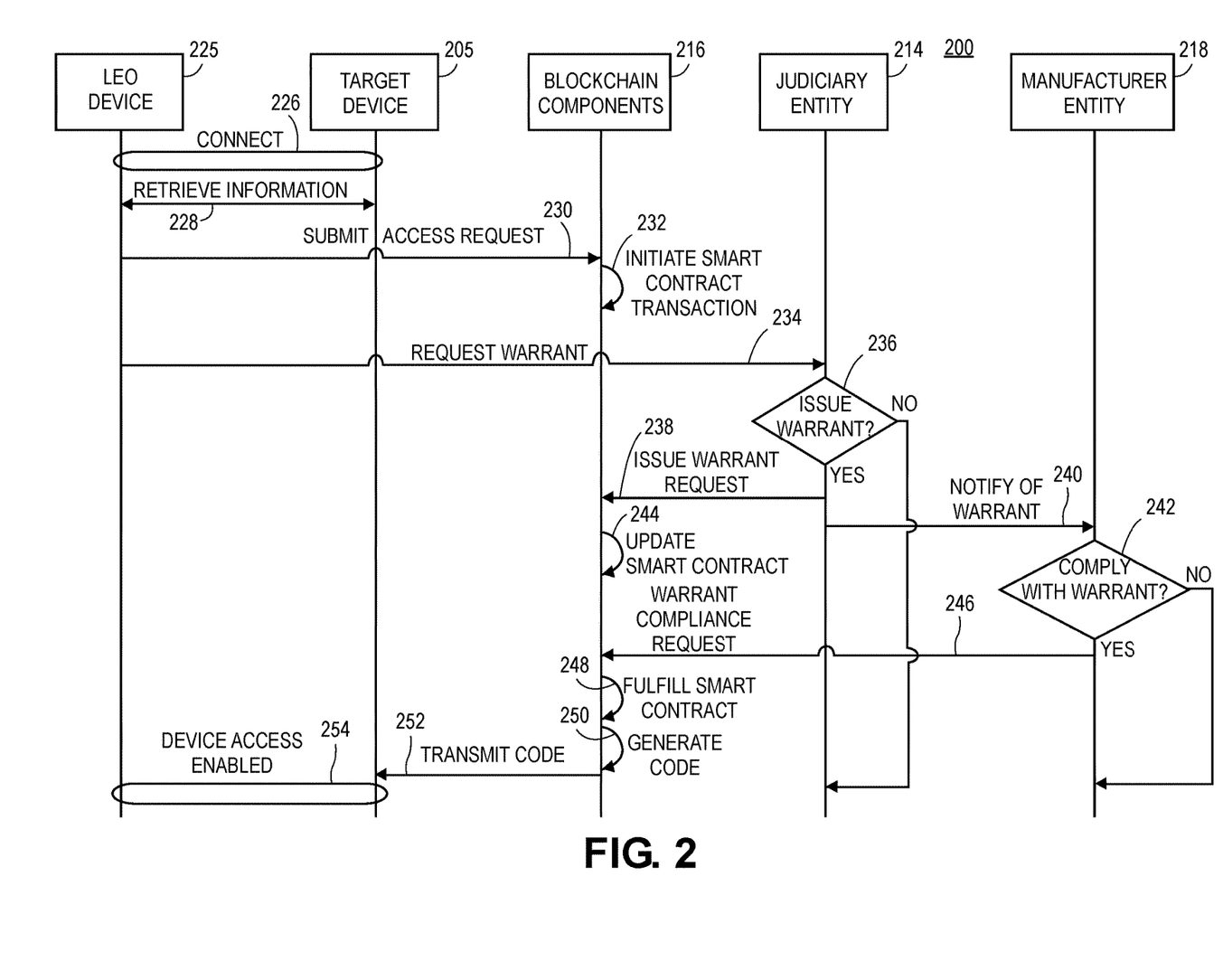
FIG. 2 depicts a signal diagram of certain components and functionalities associated therewith, in accordance with some embodiments.

FIG. 2 depicts a signal diagram 200 of various devices, components, and entities, and communications therebetween associated with the systems and methods. The signal diagram 200 may include the following devices, components, or entities: a law enforcement officer (LEO) device 225 (such as the electronic device 102 as discussed with respect to FIG. 1), a target device 205 (such as the target device 105 as discussed with respect to FIG. 1), blockchain components 216 (such as the blockchain components 116 as discussed with respect to FIG. 1), a judiciary entity 214 (such as the judiciary entity 114 as discussed with respect to FIG. 1), and a manufacturer entity 218 (such as the manufacturer entity 118 as discussed with respect to FIG. 1).

Each of the LEO device 225, judiciary entity 214, and manufacturer entity 218 may comprise a set of hardware and software components configured to execute, access, and/or support a software application, website, portal, or the like (generally, an "application") that may interface or communicate with the blockchain components 216. The application may employ various features such as encryption, multifactor authentication, whitelists, and/or the like, such as to prevent unauthorized access. Further, the blockchain components 216 may be a plurality of node computers that may support the creation, updating, and storage of blockchain-based smart contacts, where the law enforcement entity (e.g., the police) associated with the LEO device 225, the judiciary entity 214, and the manufacturer entity 218 may be considered parties to a given smart contract. According to embodiments, the manufacturer entity 218 may be a manufacturer, supplier, or developer of the target device 205 and/or of any software application or operation system executable or supported by the target device 205.

The signal diagram 200 may start when the LEO device 225 connects (226) to the target device 205. In embodiments, an appropriate individual (e.g., a law enforcement officer) may use the LEO device 225 to log into the application. An account of the appropriate individual with the application may contain identifying information associated with the appropriate individual (e.g., police badge number, agency or organization, and/or warrant number to facilitate matching the request, the target device 205, and a desired warrant). After the appropriate individual logs into the application, the LEO device 225 may initiate a request for access to the target device 205 via a technique or feature on the LEO device 225 or the application, or a via a technique or feature on the target device 205. In embodiments, the technique or feature used to request access to the target device 205 (or a connection to the LEO device 225) may be a hardware toggle (e.g., a two-button press), a specific interaction with the user interface (e.g., a screen swipe), and/or another technique completed on the LEO device 225 or the target device 205. Upon completion of the technique or feature, a personal area connection (PAN) (e.g., Bluetooth), Wi-Fi, or other direct physical connection is established between the LEO device 225 and the target device 205.

In some embodiments, the LEO device 225 need not be associated or affiliated with a law enforcement entity, and therefore may not involve a warrant. Instead, the device 225 may be that of a third party individual, entity, or agency that desires to access the target device 205. For example, the device 225 may be a smartphone belonging to a family member of an individual whose smartphone is the target device 205, in which case a request from the device 225 to the target device 205 does not specify or comply with any type of warrant.

After the LEO device 205 connects to the target device 205, the LEO device 205 may request (228) the target device 205 to transmit information identifying the target device 205 and/or a user thereof to the LEO device 225 and/or the application via the connection. In embodiments, the target device 205 may automatically transmit the identifying information to the LEO device 225 upon connecting to the LEO device 225.

In some implementations, the target device 205 may need to be connected to the internet (and to the blockchain components 216) via a network connection (e.g., WLAN, LAN, etc.). Further, the target device 205 may need to be in "airplane mode" (or a similar mode) for the target device 205 to transmit the identifying information to the LEO device 225, such as to prevent access to cloud-based data to which the target device 205 may have access.

After receiving the identifying information, the LEO device 225 may submit (230) an access request to the blockchain components 216 via the application. Although the embodiments describe the LEO device 225 submitting the access request, where the LEO device 225 is associated with a law enforcement entity, it should be appreciated that the access request may be initiated or submitted by any party or entity, such as an individual, a judiciary entity, a manufacturer, and/or other entities. The blockchain components 216 may initiate (232) a smart contract transaction in which information associated with the law enforcement entity is added to the smart contact transaction, where such an initiation is replicated on the shared ledger stored on each of the plurality of node computers. In effect, the first condition of the smart contract transaction may be fulfilled (i.e., a proper device access request from a law enforcement entity).

The LEO device 225 may additionally request (234) a warrant from the judiciary entity 214 in accordance with local and federal laws (e.g., a formal justification for access based on probable cause or other legal requirements), where the request may include a justification for access as well as an identification of the target device 205. According to embodiments, the application may notify the judiciary entity 214 of the pending request, where an appropriate individual associated with the judiciary entity 214 may log into the application, access the request, and match the request to the target device 205 specified in the request. The judiciary entity 214 may issue or not issue (236) the warrant based on various conditions or factors. In particular, an appropriate judge may review the warrant request and decide to issue or not issue the warrant based on laws of the applicable jurisdiction. If the judiciary entity 214 issues the warrant ("YES"), processing may proceed to (238), or if the judiciary entity 214 does not issue the warrant ("NO"), processing may end, repeat, or proceed to other functionality, and the smart contract transaction initiated in (232) will not be fulfilled.

To issue the warrant, an appropriate individual associated with the judiciary entity 214 (e.g., a judge) may sign a warrant granting restricted or unrestricted access to the target device 205, where access may be restricted by data type, data age, or another attribute, and may be granted for a specific time frame. Accordingly, at (238), the judiciary entity 214 may send an issue warrant request to the blockchain components 216. After the blockchain components 216 receive the request, the blockchain components 216 may update (244) the smart contract transaction.

According to embodiments, the issue warrant request may specify unrestricted or restricted access to the target device 205. If the issue warrant request specifies unrestricted access to the target device 205 (i.e., grants force of law to the access request from the LEO device 225), the blockchain components 216 may add information associated with the judiciary entity (214) (e.g., information identifying a court) to the smart contract transaction, where the update is replicated on the shared ledger stored on each of the plurality of node computers. If the issue warrant request specifies restricted access to the target device 205 (i.e., grants force of law to the access request for specific applications or data), the blockchain components 216 may add information associated with the judiciary entity (214) (e.g., information identifying a court) to the smart contract transaction as well as any restrictions of the issued warrant, where the update is replicated on the shared ledger stored on each of the plurality of node computers. For example, a restricted access warrant may allow access to communication application data but not financial application data; allow access to GPS and cellular location data but not images or communication data; and/or the like. In either situation, the second condition of the smart contract transaction may be fulfilled (i.e., issuance of a warrant from a judicial entity).

After issuing the warrant, the judiciary entity (214) may also notify (240) the manufacturer entity 218 of the warrant, such as via the application. According to embodiments, the application may notify the manufacturer entity 218 of the pending warrant, where an appropriate individual associated with the manufacturer entity 218 may log into the application, access the original request, and match the request to the target device 205 specified in the warrant. The manufacturer entity 218 may determine (242) whether to comply with the warrant, based on various factors or considerations. It should be appreciated that the decision to comply with the warrant may be based on various business factors, or other considerations.

If the manufacturer entity 218 does not comply with the warrant ("NO"), processing may end, repeat, or proceed to other functionality, and the smart contract transaction initiated in (232) will not be fulfilled. If the manufacturer entity 218 does comply with the warrant ("YES"), the manufacturer entity 218 may send (246) a warrant compliance request to the blockchain components 216. In some scenarios, the warrant request may expire after a set time period, in which case processing may end, repeat, or proceed to other functionality, and the smart contract transactions initiated in (232) will not be fulfilled.

After receiving the warrant compliance request, the blockchain components 216 may fulfill (248) the smart contract transaction. In particular, the blockchain components 216 may add information associated with the manufacturer entity 216 to the smart contract transaction, where the update is replicated on the shared ledger stored on each of the plurality of node computers. In effect, the third condition of the smart contract transaction (and therefore the entire smart contract transaction) may be fulfilled (i.e., compliance with a warrant by a manufacturer entity).

In response to the smart contract transaction being fulfilled, the blockchain components 216 may generate (250) a code according to the smart contract transaction and transmit (252) the code to the target device 205 via an internet connection or another network connection. In embodiments, the blockchain components 216 may additionally transmit the code to the manufacturer entity 218, and the manufacturer entity 218 may activate an unlock feature associated with the target device 205 and transmit a proprietary code to the target device 205. According to embodiments, the code (or the proprietary code) may be sent to the operating system or an application installed on the target device 205.

If the issue warrant request specifies unrestricted access to the target device 205, the code may grant the law enforcement agency one-time access to the target device 205 without or without an expiration time/date and/or with or without use of an airplane mode or similar mode. If the issue warrant request specifies restricted access to the target device 205, the code may grant the law enforcement agency limited one-time access (i.e., in accordance with the warrant) to the target device 205 without or without an expiration time/date and/or with or without use of an airplane mode or similar mode.

After the code is generated and transmitted, access to the target device 205 by the law enforcement agency is enabled. In particular, the target device 205 may detect that the transaction is fulfilled by the blockchain components 216 and, in response to the fully-authenticated blockchain transaction, may enable local access, restricted or unrestricted, with airplane mode enabled or not enabled in accordance with the issued warrant. In an implementation, the target device 205 may receive instructions (e.g., from the LEO device 225) to enable access according to parameters defined by the completed transaction.

In an implementation, such as if a pre-existing smart contract transaction does not exist, the LEO device 225 may notify an appropriate individual that the transaction is complete and ready to sign, and may enable the appropriate individual to sign the transaction. Additionally, when the appropriate individual signs the transaction via the application, the application sends the signed transaction to the blockchain components 216 and to the target device 205, and the target device 205 may query the blockchain components 216 for determination of whether the transaction is complete.

Similarly, if a pre-existing smart contract does not exist, an appropriate individual associated with the judiciary entity 214 (e.g., a court clerk) may add information associated with the judiciary entity 214 to the transaction initiated by the LEO device 225 and submit the transaction to the manufacturer entity 218. Additionally, the application may notify each of the judiciary entity 214 and the manufacturer entity 218 when the transaction is complete and ready to sign, in which case an appropriate individual associated with each of the judiciary entity 214 and the manufacturer entity 218 may sign the transaction, where the finalized instructions may instruct the target device 205 to grant limited or unlimited access, and/or may require (or not require) the target device 205 to be in airplane mode for the duration of the access by the law enforcement agency.

The systems and methods discussed herein describe using a distributed ledger (i.e., the blockchain components 216) to grant access to the target device 205, it should be appreciated that the systems and methods may also use the distributed ledger to grant access to a target account and/or to certain target data, files, or documents associated with a target account. In embodiments, a target account may be held by or associated with an individual or user, a group of individuals, or an entity such as a firm, corporation, or the like. A certain entity (e.g., a company, corporation, services provider) may service the target account for the account holder.

The target account may have associated account data, wherein the account servicer may store the account data for the account holder. Additionally, the account holder may access, review, update, and/or delete the account data via a log-in procedure with the account servicer. For example, the account holder may complete the log-in procedure via a website, application, and/or the like. Once logged in, the account holder may access, review, update, and/or delete any portion(s) of the account data.

According to embodiments, a request may be made to access a target account or a specific electronic file associated with a target account (e.g., in the access request submitted in (230)). In this scenario, the account servicer may be comparable to the manufacturing entity 118, 218 as discussed with respect to FIGS. 1 and 2, the target account may be comparable to the target device 105, 205 as discussed with respect to FIGS. 1 and 2, and the account holder may be comparable to the individual or user associated with the target device 105, 205 as discussed with respect to FIGS. 1 and 2. Additionally, the access request may originate from the LEO device 225 as discussed with respect to FIG. 2. Additionally, in association with accessing a target account, the blockchain components may generate (250) a code that may include credentials or a password that an appropriate entity or device may use to access (e.g., by logging into) the target account.

Although not illustrated in FIG. 2, it should be appreciated that one or more additional entities may interface with the blockchain components 216, and request to access or modify the smart contract. In this regard, the one or more additional entities may be considered a signatory or party to or otherwise indicated in the smart contract. For example, one of the additional entities may be a watchdog organization (e.g., one of the watchdog organizations as discussed with respect to FIG. 1) that may request to access and review the smart contract. If the blockchain components 216 grant the watchdog organization with access to the smart contract, the watchdog organization may request that the smart contract be updated as to whether the watchdog organization approves (or disapproves) of the information included in the smart contract. Accordingly, the blockchain components 216 may update the smart contract to indicate that the smart contract has been approved (or disapproved) by the watchdog organization. It should be appreciated that additional use cases involving an additional entity accessing and/or updating the smart contract via the blockchain components 216 are envisioned.

Additionally, it should be appreciated that the order of access of the blockchain components 216 and data associated therewith may vary. For example, although FIG. 2 illustrates the blockchain components 216 being accessed by the LEO device 225, then the judiciary entity 214, then the manufacturer entity 218, the blockchain components 216 may alternatively be accessed by the judiciary entity 214, then the LEO device 225, then the manufacturer entity 218 (or in any other order). Thus, any entity (e.g., law enforcement, the judiciary entity 214, the manufacturer entity 218, or another entity) may initiate a smart contract transaction, and it may or may not be the case that the smart contract itself is not valid until all of the required signatories sign the transaction.

For example, a law enforcement entity may request a warrant in association with an account hosted by a social networking service, but may not be in possession of a physical device. A judiciary entity that normally grants a warrant may make the initial account access request directly with the social networking service, and the social networking service may initiate a smart contract transaction by identifying the account specified in the warrant, whereby the account "identity" may become the initial signatory of the smart contract. Then, the second signatory of the smart contract may be the law enforcement entity, the third signatory of the smart contract may be the judiciary entity, and the fourth signatory of the smart contract may be the social networking service.

According to embodiments, the application may support an online portal for use by various individuals, organizations (including the watchdog organization(s) 120 such as consumer advocate organizations, privacy advocate organizations, human rights organizations, and/or similar organizations). The portal may include or enable access to various information such as, for example, the requesting entity (e.g., name and/or agency), acknowledgement that a warrant was issued or not issued, even if the contents of the warrant are classified, identifying information about the warrant, compliance or non-compliance by the manufacturer entity, acknowledgement that legal action was taken as a result of non-compliance, even if the contents or outcome of the lawsuit or hearing were classified, and/or other information. Additionally, the portal may include or enable access to various metrics such as, for example, number of access requests by law enforcement agencies, percentage of access request by the judiciary entities (i.e., percentage of warrants issued), number of warrants issued, percentage of warrants accepted by the manufacturer entities, percentage of warrants declined by the manufacturer entities that result in legal action, and/or other metrics.

Figure 3:
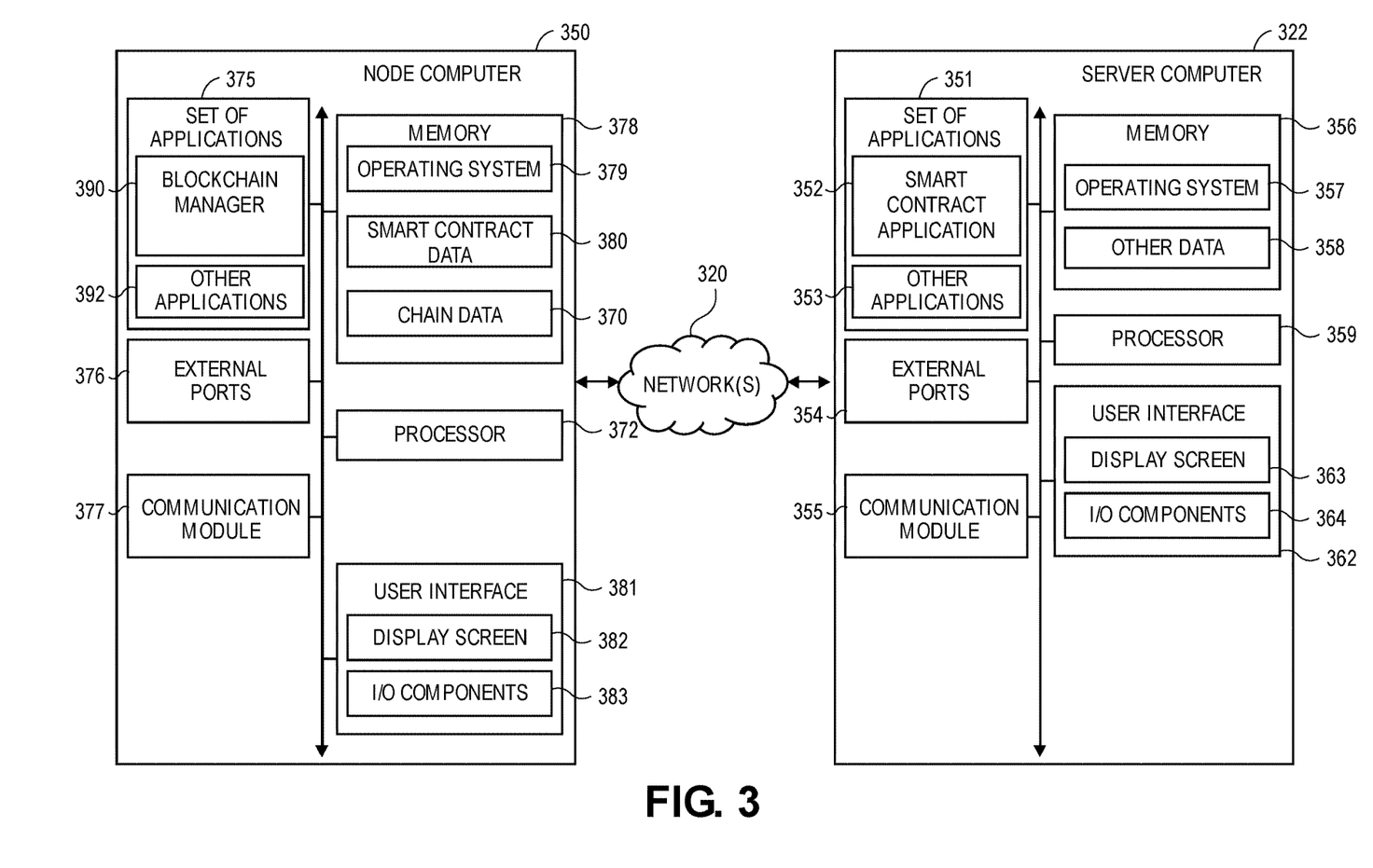
FIG. 3 is a hardware diagram depicting an example server and an example node computer, in accordance with some embodiments.

FIG. 3 illustrates a hardware diagram of an example node computer 350 (such as one of the plurality of node computers as discussed with respect to FIGS. 1 and 2) and an example server computer 322 (such as the server computer 122 as discussed with respect to FIG. 1), in which the functionalities as discussed herein may be implemented. Although a single node computer 350 is depicted in FIG. 3, it should be appreciated that multiple node computers are envisioned.

The node computer 350 may include a processor 372 as well as a memory 378. The memory 378 may store an operating system 379 capable of facilitating the functionalities as discussed herein as well as a set of applications 375 (i.e., machine readable instructions). For example, one of the set of applications 375 may be a blockchain manager 390 configured to facilitate smart contract transactions between and among the node computer 350 and other node computers. It should be appreciated that one or more other applications 392 are envisioned.

The processor 372 may interface with the memory 378 to execute the operating system 379 and the set of applications 375. According to some embodiments, the memory 378 may also include smart contract data 380 associated with the smart contract transactions and chain data 370 associated with the distributed ledger. The memory 378 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The node computer 350 may further include a communication module 377 configured to communicate data via one or more networks 310. According to some embodiments, the communication module 377 may include one or more transceivers (e.g., WWAN, WLAN, and/or WPAN transceivers) functioning in accordance with IEEE standards, 3GPP standards, or other standards, and configured to receive and transmit data via one or more external ports 376. For example, the communication module 377 may communicate with the server computer 322 via the network(s) 310.

The node computer 350 may further include a user interface 381 configured to present information to a user and/or receive inputs from the user. As shown in FIG. 3, the user interface 381 may include a display screen 382 and I/O components 383 (e.g., ports, capacitive or resistive touch sensitive input panels, keys, buttons, lights, LEDs). According to some embodiments, the user may access the node computer 350 via the user interface 381 to review information, make selections, and/or perform other functions.

As illustrated in FIG. 3, the node computer 350 may communicate and interface with the server computer 322 via the network(s) 310. The server computer 322 may include a processor 359 as well as a memory 356. The memory 356 may store an operating system 357 capable of facilitating the functionalities as discussed herein as well as a set of applications 351 (i.e., machine readable instructions). For example, one of the set of applications 351 may be a smart contract application 352 configured to facilitate transactions associated with smart contracts. It should be appreciated that one or more other applications 353 are envisioned.

The processor 359 may interface with the memory 356 to execute the operating system 357 and the set of applications 351. According to some embodiments, the memory 356 may also include other data 358, such as data associated with smart contracts, entities that are parties to smart contracts, and target devices. The memory 356 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server computer 322 may further include a communication module 355 configured to communicate data via the one or more networks 310. According to some embodiments, the communication module 355 may include one or more transceivers (e.g., WWAN, WLAN, and/or WPAN transceivers) functioning in accordance with IEEE standards, 3GPP standards, or other standards, and configured to receive and transmit data via one or more external ports 354. For example, the communication module 355 may transmit, to the node computer 350, requests and instructions from parties to smart contract transactions, and receive, from the node computer 350, transaction data associated with smart contracts.

The server computer 322 may further include a user interface 362 configured to present information to a user and/or receive inputs from the user. As shown in FIG. 3, the user interface 362 may include a display screen 363 and I/O components 364 (e.g., ports, capacitive or resistive touch sensitive input panels, keys, buttons, lights, LEDs). According to some embodiments, the user may access the server computer 322 via the user interface 362 to review information, make selections, and/or perform other functions.

In some embodiments, the server computer 322 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 372, 359 (e.g., working in connection with the respective operating systems 379, 357) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Figure 4:
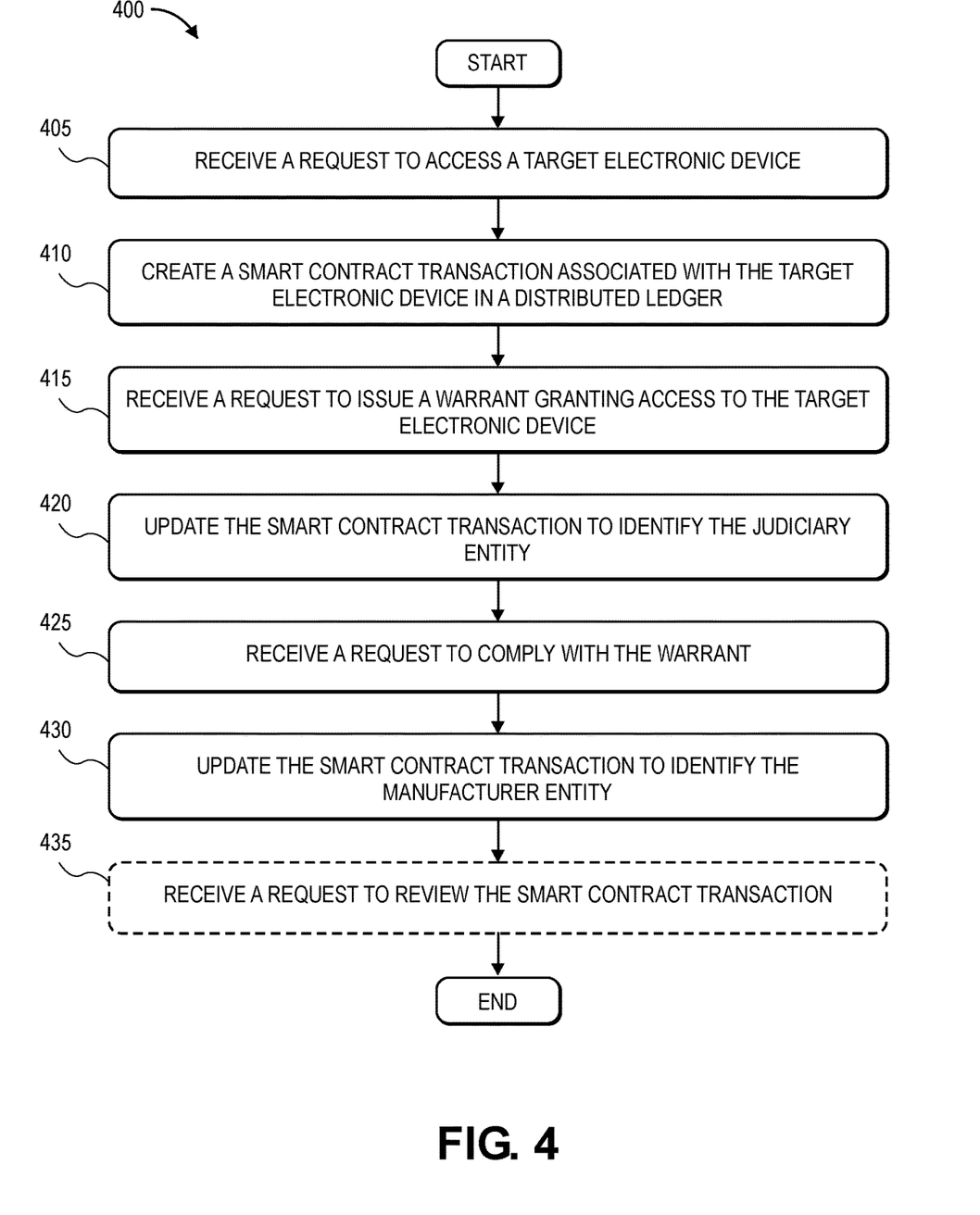
FIG. 4 is a flow diagram associated with enabling access to a target electronic device using a distributed ledger, in accordance with some embodiments.

FIG. 4 is a block diagram of an example method 400 of enabling access to a target electronic device using a distributed ledger. The method 400 may be facilitated by a plurality of node computers that maintains the distributed ledger, and that may be in communication with additional devices, entities, or data sources.

The method 400 may start when the plurality of node computers receives (block 405) a request to access a target electronic device. Although the following describes a request to access the target electronic device, it should be appreciated that the method 400 may be facilitated in association with a request to access a target account. According to embodiments, the request may be initiated by a law enforcement entity. The plurality of node computers may, after receiving the request to access the target electronic device, create (block 410) a smart contract transaction associated with the target electronic device in the distributed ledger. In embodiments, the smart contract transaction may identify the law enforcement entity.

The plurality of node computers may receive (block 415) a request to issue a warrant granting access to the target electronic device. In embodiments, the request to issue the warrant may be initiated by a judiciary entity. The plurality of node computers may, after receiving the request to issue the warrant, update (block 420) the smart contract transaction to identify the judiciary entity. In a scenario, the request to issue the warrant may specified restricted access to the target electronic device, and the smart contract transaction may be updated to identify the judiciary entity and a set of restrictions of the warrant.

Additionally, the plurality of node computers may receive (block 425) a request to comply with the warrant. According to embodiments, the request to comply with the warrant may be initiated by a manufacturer entity associated with the target electronic device. After receiving the request to comply with the warrant, the plurality of node computers may update (block 430) the smart contract transaction to identify the manufacturer entity. In embodiments, when the smart contract transaction is updated, a code that enables access to the target electronic device may be generated. Accordingly, an appropriate entity (e.g., the law enforcement entity) may review and use the code to access the target electronic device. In some cases, the plurality of node computers may transmit, via a network connection, the code to the target electronic device, and/or transmit the code to the manufacturer entity, which may activate an unlock feature associated with the target electronic device and transmit a proprietary code to the target electronic device. Additionally, the code may enable one-time (or multiple-time) access to the target electronic device.

In an optional embodiment, the plurality of node computers may receive (block 435) a request to review the smart contract transaction. According to embodiments, the request to review the smart contract transaction may be initiated by a watchdog organization, and the plurality of node computers may (or may not) enable the watchdog organization to access the smart contract transaction.

According to some embodiments, the systems and methods may employ challenge-response authentication functionalities. Generally, a challenge-response authentication is a family of protocols in which one party presents a question ("challenge") and another party must provide a valid answer ("response") to be authenticated. For example, a challenge may ask for a password and a valid response is the correct password. Challenge-response authentication may be used in various applications, such as for two-factor authentication.

The systems and methods may employ challenge-response authentication to verify that some event has occurred (or that a predetermined requirement has been met), such as a blockchain transaction. Thus, the systems and methods may support the following functionalities: sending an encrypted outbound challenge such as a request for a one-time code, verifying that an event has occurred or one or more requirements have been met, and receiving an inbound response answering or affirming the challenge. The challenge-response functionality may be used in combination with any of the features or functionalities as discussed herein. For example, any of the LEO device 225, the judiciary entity 214, or the manufacturer entity 218 may initiate a challenge-response to verify that a blockchain transaction occurred (i.e., whether the blockchain components 216 updated (244) the smart contract).

Although the following text sets forth a detailed description of numerous different embodiments, it should be understood that the legal scope of the systems and methods may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of enabling access to a target electronic device using a distributed ledger maintained by a plurality of node computers, the method comprising:
   receiving, by the plurality of node computers, a request to access the target electronic device, the request to access the target electronic device initiated by a law enforcement entity;
   after receiving the request to access the target electronic device, creating, by the plurality of node computers, a smart contract transaction associated with the target electronic device in the distributed ledger, the smart contract transaction identifying the law enforcement entity;
   receiving, by the plurality of node computers, a request to issue a warrant granting access to the target electronic device, the request to issue the warrant initiated by a judiciary entity;
   after receiving the request to issue the warrant, updating, by the plurality of node computers, the smart contract transaction to identify the judiciary entity; receiving, by the plurality of node computers, a request to comply with the warrant, the request to comply with the warrant initiated by a manufacturer entity associated with the target electronic device;
   after receiving the request to comply with the warrant, updating the smart contract transaction to identify the manufacturer entity, resulting in generation of a code that enables access to the target electronic device;
   receiving a request to review the smart contract transaction, the request to review the smart contract transaction initiated by a watchdog organization, wherein the watchdog organization is different from the plurality of node computers; and
   based on the request to review the smart contract transaction, enabling the watchdog organization to access the smart contract transaction.

2. The computer-implemented method of claim 1, further comprising:
   receiving, by the plurality of node computers, a request to update the smart contract transaction with additional information, the request to update the smart contract transaction initiated by an additional entity; and
   after receiving the request to update the smart contract transaction, further updating the smart contract with the additional information.

3. The computer-implemented method of claim 2, wherein the additional entity is the watchdog organization.

4. The computer-implemented method of claim 1, wherein the request to issue the warrant specifies restricted access to the target electronic device, and wherein updating the smart contract transaction to identify the judiciary entity comprises:
   updating, by the plurality of node computers, the smart contract transaction to identify the judiciary entity and a set of restrictions of the warrant.

5. The computer-implemented method of claim 1, further comprising:
   transmitting, via a network connection, the code to the target electronic device.

6. The computer-implemented method of claim 1, further comprising:
   transmitting the code to the manufacturer entity, wherein the manufacturer entity activates an unlock feature associated with the target electronic device and transmits a proprietary code to the target electronic device.

7. The computer-implemented method of claim 1, wherein the code enables one-time access to the target electronic device.

8. The computer-implemented method of claim 1, further comprising:
   receiving, by the server computer from an additional entity, a request to update the smart contract transaction with additional information; and
   after receiving the request to update the smart contract transaction, causing the plurality of node computers to further update the smart contract with the additional information.

9. The computer-implemented method of claim 1, wherein the request to issue the warrant specifies restricted access to the target electronic device, and wherein causing the plurality of node computers to update the smart contract transaction to identify the judiciary entity comprises:
   causing the plurality of node computers to update the smart contract transaction to identify the judiciary entity and a set of restrictions of the warrant.

10. The computer-implemented method of claim 1, further comprising:
    transmitting, via a network connection, the code to the target electronic device.

11. The computer-implemented method of claim 1, further comprising:
    transmitting the code to either the manufacturer entity or the account servicer, wherein either the manufacturer entity or the account servicer activates an unlock feature associated with either the target electronic device or the target account.

12. The computer-implemented method of claim 1, wherein the code enables one-time access to either the target electronic device or the target account.

13. A system to enable access to a target electronic device using a distributed ledger maintained by a plurality of node computers, comprising:
    a transceiver for communicating with the plurality of node computers;
    a memory storing a set of computer-executable instructions; and
    a processor interfacing with the transceiver and the memory, and configured to execute the set of computer-executable instructions to cause the processor to:
    receive, from a law enforcement entity via the transceiver, a request to access the target electronic device,
    after receiving the request to access the target electronic device, cause the plurality of node computers to create a smart contract transaction associated with the target electronic device in the distributed ledger, the smart contract transaction identifying the law enforcement entity, receive, from a judicial entity via the transceiver, a request to issue a warrant granting access to the target electronic device, after receiving the request to issue the warrant, cause the plurality of node computers to update the smart contract transaction to identify the judicial entity, receive, from a manufacturer entity associated with the target electronic device via the transceiver, a request to comply with the warrant, after receiving the request to comply with the warrant, cause the plurality of node computers to update the smart contract transaction to identify the manufacturer entity, resulting in generation of a code that enables access to the target electronic device, receive a request to review the smart contract transaction, the request to review the smart contract transaction initiated by a watchdog organization, wherein the watchdog organization is different from the plurality of node computers, and based on the request to review the smart contract transaction, enable the watchdog organization to access the smart contract transaction.

14. The system of claim 13, wherein the processor is further configured to:

receive, from an additional entity via the transceiver, a request to update the smart contract transaction with additional information, and after receiving the request to update the smart contract transaction, cause the plurality of node computers to further update the smart contract with the additional information.

15. The system of claim 13, wherein the request to issue the warrant specifies restricted access to the target electronic device, and wherein to cause the plurality of node computers to update the smart contract transaction to identify the judiciary entity comprises:

cause the plurality of node computers to update the smart contract transaction to identify the judiciary entity and a set of restrictions of the warrant.

16. The system of claim 13, wherein the processor is further configured to:

transmit, via the transceiver, the code to the target electronic device.

17. The system of claim 13, wherein the processor is further configured to:

transmit, via the transceiver, the code to the manufacturer entity, wherein the manufacturer entity activates an unlock feature associated with the target electronic device and transmits a proprietary code to the target electronic device.

18. The system of claim 13, wherein the code enables one-time access to the target electronic device.

19. A computer-implemented method of facilitating access to either a target electronic device or a target account, the method comprising:

receiving, by a server computer from a law enforcement agency, a request to access either the target electronic device or the target account;

after receiving the request to access either the target electronic device or the target account, causing a plurality of node computers to create a smart contract transaction associated with either the target electronic device or the target account in a distributed ledger, the smart contract transaction identifying the law enforcement agency;

receiving, by the server computer from a judicial entity, a request to issue a warrant granting access to either the target electronic device or the target account;

after receiving the request to issue the warrant, causing the plurality of node computers to update the smart contract transaction to identify the judicial entity;

receiving, by the server computer from a manufacturer entity or an account servicer associated with either the target electronic device or the target account, a request to comply with the warrant;

after receiving the request to comply with the warrant, causing the plurality of node computers to update the smart contract transaction to identify the manufacturer entity, resulting in generation of a code that enables access to either the target electronic device or the target account;

receiving, by the server computer, a request to review the smart contract transaction, the request to review the smart contract transaction initiated by a watchdog organization, wherein the watchdog organization is different from the plurality of node computers; and based on the request to review the smart contract transaction, enabling the watchdog organization to access the smart contract transaction.

\* \* \* \* \*